United States Patent [19]

Williams

[11] Patent Number: 4,611,743

[45] Date of Patent: Sep. 16, 1986

[54] DEVICE FOR ALIGNING A WELDOLET AND A PIPE TO BE JOINED

[76] Inventor: Stanley B. Williams, 2088 E. Empire, Lot 151, Benton Harbor, Mich. 49022

[21] Appl. No.: 693,575

[22] Filed: Jan. 22, 1985

[51] Int. Cl.[4] .............................................. B23K 37/04
[52] U.S. Cl. .................................. 228/49.1; 228/49.3; 228/44.5; 269/41; 269/49; 219/161
[58] Field of Search ...................... 228/212, 213, 49.1, 228/49.2, 49.3, 47, 44.3, 44.5, 44.7; 269/41, 49, 208, 243, 287; 219/158, 161

[56] References Cited

U.S. PATENT DOCUMENTS

| 1,509,507 | 9/1924 | Gruenfeldt | 219/159 |
| 2,669,013 | 2/1954 | Wilson | 269/287 X |

FOREIGN PATENT DOCUMENTS 2112686A 7/1983 United Kingdom ............... 228/49.3

Primary Examiner—Kuang Y. Lin
Attorney, Agent, or Firm—Gary, Juettner & Pyle

[57] ABSTRACT

A device supports a weldolet on a pipe with a passage through the weldolet in aligned relationship with an opening in the pipe in order that the weldolet and pipe may be joined by welding or the like. The device is adjustable to accommodate weldolets and pipes of various different sizes.

9 Claims, 3 Drawing Figures

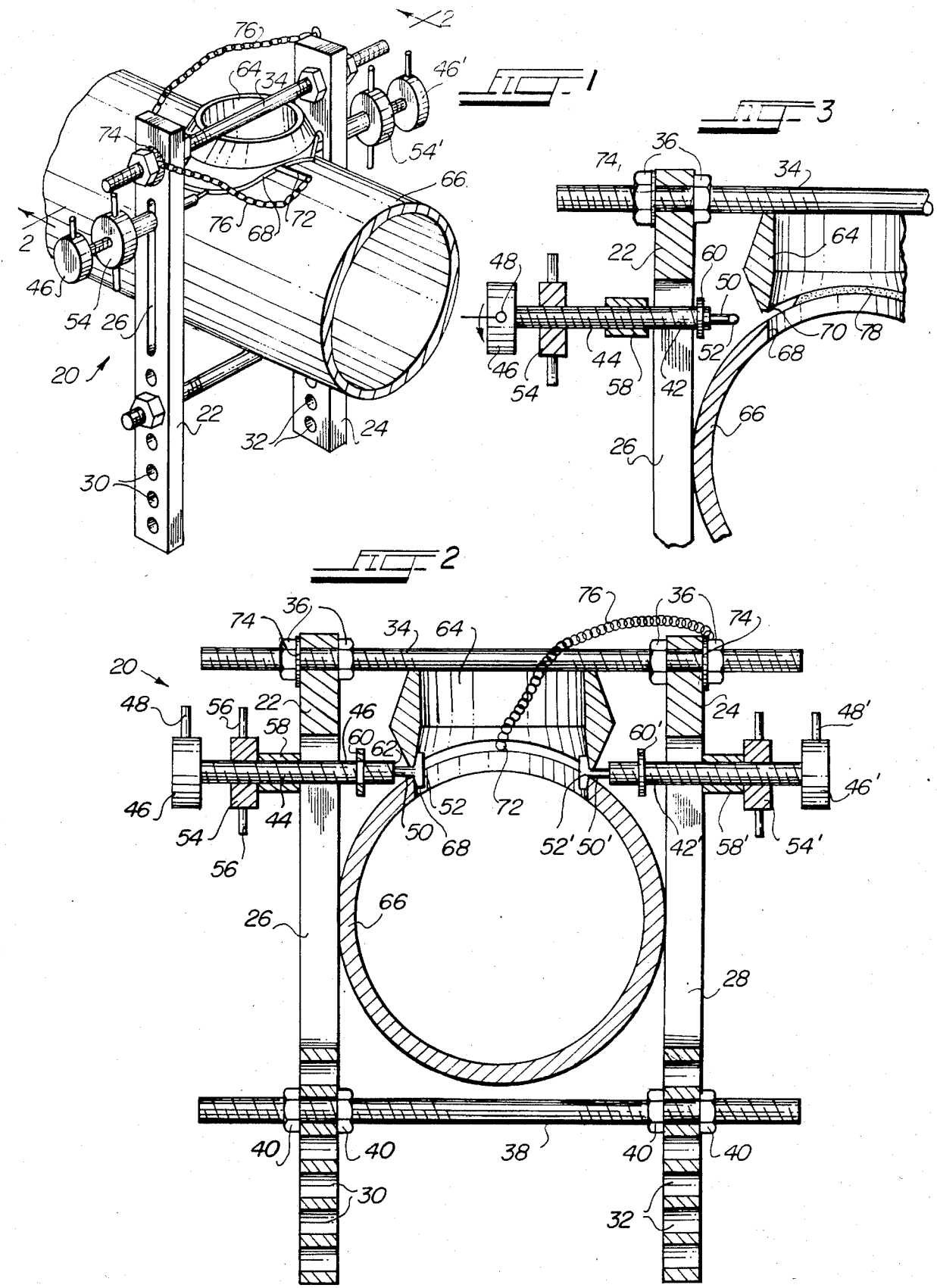

4,611,743

DEVICE FOR ALIGNING A WELDOLET AND A PIPE TO BE JOINED

BACKGROUND OF THE INVENTION

The present invention relates to a device for supporting a weldolet on a pipe about an opening therein in order that the same may be joined.

In plumbing and other manufacturing operations, metal weldolets are often connected to metal pipes by welding. The weldolet must be supported in alignment with the pipe in order that it may be welded to the pipe about an opening therein, and this may be accomplished by two individuals, one of whom holds the weldolet in position relative to the pipe while the other welds a connection therebetween. In the alternative, improvised supports, such as wooden beams and braces, may be employed to hold the weldolet in position on the pipe. Such conventional techniques for supporting a weldolet are, to say the least, cumbersome, inconvenient and time consuming, and often require the effort of more than one individual.

OBJECT OF THE INVENTION

The primary object of the present invention is to provide a device which may be used by a single individual to quickly, accurately and conveniently support a weldolet on a pipe in proper position for being welded to the pipe.

SUMMARY OF THE INVENTION

In accordance with the present invention, a device for supporting a weldolet with a passage therethrough on a pipe in aligned relationship with a passage through a side of the pipe in order that the weldolet and pipe may be joined by welding or the like, the weldolet and pipe passages having substantially equal diameter, comprises frame means positionable around and engageable with the weldolet and pipe to support the weldolet on the pipe. Also included are a pair of guide means carried on opposite sides of said frame means, each said guide means including an elongate extension and an elongate guide member at an end of said extension generally perpendicular thereto. Said extensions are extendible between the weldolet and pipe on opposite sides of the passages therein and said guide members are extendible within the passages with said frame means supporting the weldolet on the pipe, said extension then spacing the weldolet a selected distance from the pipe and said guide members are engageable with surfaces of the passages. Means are provided for moving each said guide means toward the side of said frame means on which it is mounted to move said guide members against the passage surfaces on opposite sides of the weldolet and pipe to bring the passages into the aligned relationship for joining the weldolet to the pipe.

Other objects, advantages and features of the invention will become apparent upon a consideration of the following detailed description, when taken in conjunction with the accompanying drawings.

BRIEF DESCRIPTION OF THE DRAWINGS

FIG. 1 is a perspective view of a device in accordance with the teachings of the present invention, showing the device supporting a weldolet on a pipe so that the same may be joined by welding or the like;

FIG. 2 is a cross sectional side elevation view taken substantially along the lines 2—2 of FIG. 1; and FIG. 3 is a fragmentary cross sectional side elevation view.

DETAILED DESCRIPTION

Referring to the drawings, which illustrate salient features of a preferred embodiment of the invention, and in particular to FIGS. 1 and 2, a device for aligning and supporting a weldolet on a pipe to which it is to be joined is indicated generally at 20, and comprises a frame including a pair of elongate bars 22 and 24 having respective longitudinally extending slots 26 and 28 toward one end thereof and respective pluralities of longitudinally spaced passages 30 and 32 toward an opposite end thereof. A spacer rod 34, threaded at its opposite ends, extends through a passage in each bar toward the end thereof having the slot, and is held in place by nuts 36 which are adjustable to control the spacing between the bars. Toward the opposite ends of the bars a spacer rod 38, also threaded at its opposite ends, extends through selected ones of the passages 30 and 32, and is provided with nuts 40 which hold the rod on the bars and are adjustable to control the spacing between the bars.

Referring also to FIG. 3, extending through the slot 26 in the bar 22 is an elongate rod 42 having a medial threaded section 44, a handle 46 at an outer end with a pointer 48 on the handle and a relatively narrow generally rectangular extension 50 at an opposite end. A relatively elongate generally rectangular guide 52 connects medially along its length with an end of the extension perpendicular thereto, and the extension has a relatively long dimension in the direction along the length of the guide, a shorter dimension or thickness, substantially equal to the thickness of the guide, in the direction perpendicular to the length of the guide and, although not specifically shown, curved upper and lower surfaces, as seen in FIG. 2. A tensioning lever 54 is threaded about and rotatably movable along the threaded section of the rod outwardly of the bar 22 by means of a pair of handles 56, a sleeve 58 is around and slidable along the threaded section between the tensioning lever and the bar, and a retaining washer 60 around the rod 42 inwardly of the bars is retained thereon by means of an enlarged end 62 of the rod, whereby the rod is slidable longitudinally along and transversely of the slot 26 but prevented from being completely withdrawn from the slot. The arrangement is such that upon clockwise rotation of the tensioning lever 54 while the handle 46 is held against rotation, the guide 52 is moved outwardly toward the bar, while counterclockwise rotation of the tensioning lever frees the guide for movement inwardly away from the bar.

An identical elongate rod, tensioning lever, guide, etc. structure is carried by the bar 24 within its slot 28, and like components have been given like reference numbers with primes.

In use of the device 20 to support or position a weldolet 64 on a pipe 66 in alignment with an opening or passage 68 in the side of the pipe, so that wings 70 on the weldolet may be welded to the pipe about the opening, the device is first placed about the pipe at the opening. If the pipe is short, this may be accomplished simply by sliding the device over the end of the pipe and to the opening, or if the pipe is long one of the bars 22 and 24 or one of the spacer rods 34 and 38 may be removed to accommodate placement of the device around the pipe, with the bar or spacer rod then being replaced. The nuts 36 and 40 are then adjusted so that the bars are generally parallel and very close to or lightly but slidably touching opposite sides of the pipe.

With the device 20 around the pipe 66 at the opening 68, the tensioning levers 54 and 54' are rotated counterclockwise an amount sufficient to enable the elongate rods 42 and 42' to be extended, by means of the handles 46 and 46', inwardly of their respective bars 22 and 24 until the guides 52 and 52' extend inwardly of the pipe opening circumference and are oriented with their long dimensions generally perpendicular to the axis of the pipe. The weldolet 64 is then placed between the spacer rod 34 and the rectangular extensions 50 and 50', such that the weldolet wings 70 rest on the rectangular extensions and are separated from the pipe about the opening by the long dimension of the extensions, it being understood that for the purpose of accommodating the weldolet, the spacer rod 38 is mounted within passages 30 and 32 selected to provide a sufficient spacing between the rods 34 and 38. Next, the spacer rod 34 is pressed downwardly against the outer end of the weldolet while the nuts 36 and 40 are adjusted to draw the bars together so that the device tightly grips the pipe while simultaneously holding the weldolet in alignment with the pipe about the opening therein.

With the long dimensions of the guides 52 and 52' oriented generally perpendicular to the axis of the pipe, the thicknesses of the rectangular extensions 50 and 50' along their long dimensions establish an appropriate spacing between the weldolet wings 70 and the pipe about its opening for welding the weldolet to the pipe. However, because the rectangular extensions are between the weldolet and pipe 180° apart, to ensure that a proper spacing exists between the weldolet and pipe around the entirety of their adjacent circumferential peripheries, it is contemplated that a pair of spacers 72, which may be sections of welding rod of the same thickness as the long dimensions of the rectangular extensions, be inserted between the weldolet and pipe at positions 180° apart and at 90° with respect to the rectangular extensions. To connect the spacers to the device 20 so that they will be readily available for the purpose, they may conveniently be coupled with retaining rings 74 on the rod 34 by means of chains 76.

With the weldolet held in predetermined spaced relationship from the pipe opening, the tensioning levers 54 and 54' are then turned clockwise and firmly tightened. Tightening the tensioning levers serves two useful purposes. First, the faces of the guides 52 and 52' toward the rectangular extensions are generally perpendicular to the extensions, so that tightening the tensioning levers moves the guides toward the bars 22 and 24 and in the process moves the weldolet into precise coaxial alignment with the pipe opening. Secondly, pulling the guides tightly against the weldolet and pipe passage surfaces provides for a more secure aligned mounting of the weldolet on the pipe.

With the weldolet firmly clamped on the pipe in alignment with the pipe opening as shown in FIGS. 1 and 2, the same may be partially secured together by tack welds 78 (FIG. 3). To this end, a single tack weld 78 placed medially between adjacent rectangular extensions 50 and 50' and spacers 72 is sufficient to secure or join the weldolet and pipe together in aligned orientation.

After tack welding, the spacers 72 are removed from between the weldolet and pipe and, as shown in FIG. 3, the guides 52 and 52' are also removed. Removal of each guide is accomplished simply by rotating the tensioning levers 54 and 54' counterclockwise to free the guides both for movement away from the weldolet and pipe surfaces and to be rotated by the handles 46 and 46' to positions whereat their long dimensions are generally parallel to the axis of the pipe, with the curved upper and lower surfaces of the extensions 50 and 50' accommodating rotation of the extensions between the weldolet and pipe. Proper positioning of the guides is indicated by the handle pointers 48 and 48', which are aligned with the long dimensions of the guides, and with the guides rotated to positions parallel to the pipe axis, the handles 46 and 46' may be used to pull the extensions and guides out from between the pipe and weldolet, with the thinner dimensions of the extensions and guides then facilitating their removal. Thereafter, a continuous weld may be made around the entire circumferential peripheries of the weldolet and pipe opening to completely close the space between the same and to seal and join the weldolet to the pipe.

The invention thus provides an improved means for conveniently and economically supporting weldolets on pipes to enable the same to be joined in proper alignment. By virtue of the ease of operation of the device, joining weldolets to pipes may be accomplished by a single individual without need for elaborate or cumbersome supports. Also, because of the slots 26 and 28 and the adjustability of the bars 22 and 24 and spacer rods 34 and 38, the device can accommodate a large number of difference sizes of weldolets and pipes.

While one embodiment of the invention has been described in detail, various modifications and other embodiments thereof may be devised by one skilled in the art without departing from the spirit and scope of the invention, as defined in the appended claims.

What is claimed is:

1. A device for supporting a weldolet with a passage therethrough on a pipe in aligned relationship with a passage through a side of the pipe in order that the weldolet and pipe may be joined by welding or the like, the weldolet and pipe passages having substantially equal diameters, comprising frame means positionable around and engageable with the weldolet and pipe to support the weldolet on the pipe; a pair of guide means carried on opposite sides of said frame means, each said guide means including an elongate extension and an elongate guide member at an end of said extension generally perpendicular thereto, said extensions being extendible between the weldolet and pipe on opposite sides of the passages therein and said guide members being extendible within the passages with said frame means supporting the weldolet on the pipe, said extensions then spacing the weldolet a selected distance from the pipe and said guide members being engageable with surfaces of the passages; and means for moving each said guide means toward the side of said frame means on which it is mounted to move said guide members against the passage surfaces on opposite sides of the weldolet and pipe to bring the passages into the aligned relationship for joining the weldolet to the pipe, said guide members and extensions each having a relatively long dimension in the same direction, said long dimension of said guide members being greater than that of said extensions, and a relatively short dimension perpendicular to said long dimensions and less than said long dimensions of said extensions, said extensions being rotatably carried by said frame means for rotation to positions where said long dimensions extend generally parallel to the passage axes, so that the spacing between the weldolet and pipe is equal to said long dimensions of said extensions and said guide members are oriented to engage the passage surfaces upon said moving means moving said guide means toward said frame means and, after the weldolet and pipe are at least partially joined around the space therebetween, for rotation to positions whereat said short dimensions extend generally parallel to the passage axes for removal of said extensions and guide members from between the weldolet and pipe through the space therebetween.

2. A device as in claim 1, wherein said extensions connect with said guide members generally medially of said long dimensions of said guide members and surfaces of said guide members toward and on opposite sides of said extensions extend generally perpendicular to said extensions for uniform contact of said guide members with the passage surfaces.

3. A device as in claim 1, wherein said frame means carries said extensions so that the same are extendable between the weldolet and pipe about 180° apart, and including a pair of spacer means extendable between the weldolet and pipe about 180° apart and at about 90° with respect to said extensions, said spacer means supporting the weldolet on the pipe and with said extensions ensuring that a uniform space is maintained between the weldolet and pipe around the entire circumferential periphery of the passages.

4. A device as in claim 3, including flexible couplings connecting each said spacer means with said frame means.

5. A device for supporting a weldolet with a passage therethrough on a pipe in aligned relationship with a passage through a side of the pipe in order that the weldolet and pipe may be joined by welding or the like, the weldolet and pipe passages having substantially equal diameters, comprising frame means positionable around and engageable with the weldolet and pipe to support the weldolet on the pipe; a pair of guide means carried on opposite sides of said frame means, each said guide means including an elongate extension and an elongate guide member at an end of said extension generally perpendicular thereto, said extensions being extendible between the weldolet and pipe on opposite sides of the passages therein and said guide members being extendible within the passages with said frame means supporting the weldolet on the pipe, said extensions than spacing the weldolet a selected distance from the pipe and said guide members being engageable with surfaces of the passages; and means for moving each said guide means toward the side of said frame means on which it is mounted to move said guide members against the passage surfaces on opposite sides of the weldolet and pipe to bring the passages into the aligned relationship for joining the weldolet to the pipe, wherein said frame means is generally rectangular and has an open center for receiving the weldolet and pipe therewithin, first and second opposite sides of said frame means carry respective ones of said guide means and are engageable with opposite sides of the pipe to grip the pipe therebetween, a third side of said frame means is engageable with an end of the weldolet away from the pipe to hold the weldolet over the pipe passage with said extensions between the weldolet and pipe, and a fourth side of said frame means extends across the pipe opposite from the weldolet, and wherein said first, second, third and fourth sides of said frame means comprise respective first, second, third and fourth separate and elongate connected members, said frame means further including means for adjusting said members relative to each other to control the rectangular dimensions of said frame means so that said frame means is adjustable for being positioned around various different sizes of weldolets and pipes.

6. A device for supporting a weldolet with a passage therethrough on a pipe in aligned relationship with a passage through a side of the pipe in order that the weldolet and pipe may be joined by welding or the like, the weldolet and pipe passages having substantially equal diameters, comprising frame means positionable around and engageable with the weldolet and pipe to support the weldolet on the pipe; a pair of guide means carried on opposite sides of said frame means, each said guide means including an elongate extension and an elongate guide member at an end of said extension generally perpendicular thereto, said extensions being extendible between the weldolet and pipe on opposite sides of the passages therein and said guide members being extendible within the passages with said frame means supporting the weldolet on the pipe, said extensions then spacing the weldolet a selected distance from the pipe and said guide members being engageable with surfaces of the passages; and means for moving each said guide means toward the side of said frame means on which it is mounted to move said guide members against the passage surfaces on opposite sides of the weldolet and pipe to bring the passages into the aligned relationship for joining the weldolet to the pipe, wherein said frame means is generally rectangular and has an open center for receiving the weldolet and pipe therewithin, first and second opposite sides of said frame means carry respective ones of said guide means and are engageable with opposite sides of the pipe to grip the pipe therebetween, a third side of said frame means is engageable with an end of the weldolet away from the pipe to hold the weldolet over the pipe passage with said extensions between the weldolet and pipe, and a fourth side of said frame means extends across the pipe opposite from the weldolet, and wherein said first, second, third and fourth sides of said frame means comprise respective first, second, third and fourth elongate members, said first and second members have elongate slots therein, and said guide means are carried by said first and second members within said slots and are slidable therein to accommodate positioning of said guide means for placement of said extensions between the weldolet and pipe and said guide members within the weldolet and pipe passages.

7. A device as in claim 6, wherein said extensions extend through and to both sides of said slots, and said moving means comprises tensioning means on each said extension to the side of said slots away from said guide members for forcibly urging said extensions toward said tensioning means to move said guide members against the passage surfaces.

8. A device as in claim 7, wherein said extensions are threaded along medial portions thereof and said tensioning means on each said extension is threadably engaged therewith and rotatable in one direction to move said extensions and thereby said guide members toward said slots and in an opposite direction to release said extensions and guide members for movement away from said slots.

9. A device as in claim 6, wherein said first and second members each have at least one passage toward one end thereof to one side of said slots and a plurality of longitudinally spaced passages toward an opposite end thereof to an opposite side of said slots, said third member extends through and between said at least one passage of each of said first and second members and said fourth member extends through and between a selected one of said pluralilty of passages in each of said first and second members, and including means for adjustably fastening said third and fourth members in said passages to control the spacing between said first and second members, whereby said frame means is adjustable in rectangular dimensions for being positioned around various different sizes of weldolets and pipes.

* * * * *